(12) United States Patent
Osawa

(10) Patent No.: US 9,019,389 B2
(45) Date of Patent: Apr. 28, 2015

(54) IMAGE PICKUP APPARATUS THAT PERFORMS EXPOSURE CALCULATION FOR CLOSE-UP SHOOTING, METHOD OF CONTROLLING THE SAME, AND STORAGE MEDIUM

(71) Applicant: Canon Kabushiki Kaisha, Tokyo (JP)

(72) Inventor: Toshifumi Osawa, Tokyo (JP)

(73) Assignee: Canon Kabushiki Kaisha (JP)

( * ) Notice: Subject to any disclaimer, the term of this patent is extended or adjusted under 35 U.S.C. 154(b) by 45 days.

(21) Appl. No.: 13/765,720

(22) Filed: Feb. 13, 2013

(65) Prior Publication Data

US 2013/0208148 A1  Aug. 15, 2013

(30) Foreign Application Priority Data

Feb. 15, 2012  (JP) ................................. 2012-030550

(51) Int. Cl.
| | | |
|---|---|---|
| H04N 5/228 | (2006.01) | |
| H04N 5/262 | (2006.01) | |
| H04N 5/232 | (2006.01) | |
| H04N 5/235 | (2006.01) | |

(52) U.S. Cl.
CPC ........... *H04N 5/262* (2013.01); *H04N 5/23251* (2013.01); *H04N 5/235* (2013.01)

(58) Field of Classification Search
USPC .................. 348/240.1, 208.12, 208.99, 208.4
See application file for complete search history.

(56) References Cited

U.S. PATENT DOCUMENTS

| | | | | |
|---|---|---|---|---|
| 4,785,323 | A * | 11/1988 | Bell ................................ | 396/89 |
| 5,414,486 | A * | 5/1995 | Goto et al. ...................... | 396/52 |
| 6,181,875 | B1 * | 1/2001 | Hamada et al. ................. | 396/55 |
| 2006/0216010 | A1 * | 9/2006 | Yamanouchi et al. .......... | 396/55 |
| 2007/0242936 | A1 * | 10/2007 | Chujo et al. ..................... | 396/55 |
| 2008/0175575 | A1 * | 7/2008 | Nilsson ........................... | 396/77 |
| 2011/0292235 | A1 * | 12/2011 | Takada et al. .............. | 348/222.1 |

FOREIGN PATENT DOCUMENTS

JP         02-153330 A      6/1990

* cited by examiner

*Primary Examiner* — Antoinette Spinks
(74) *Attorney, Agent, or Firm* — Ross, Kimms & McDowell LLP

(57) ABSTRACT

An image pickup apparatus that reduces a camera shake and a motion blur during close-up shooting performed by increasing shooting magnification and depth of field. A control unit determines an aperture value and a shutter speed based on information on shooting magnification and a photometry result. In a situation where luminance information based on photometry result is the same, the aperture value is set larger when the shooting magnification is larger than a first value than when not larger than the same, and in a situation where the shooting magnification is larger than the first value and the luminance information is the same, the aperture value is set larger and the shutter speed is set lower when neither a camera shake nor a motion of an object within an imaging screen has occurred than when either has occurred.

15 Claims, 10 Drawing Sheets

IMAGE PICKUP APPARATUS THAT PERFORMS EXPOSURE CALCULATION FOR CLOSE-UP SHOOTING, METHOD OF CONTROLLING THE SAME, AND STORAGE MEDIUM

BACKGROUND OF THE INVENTION

1. Field of the Invention

The present invention relates to an image pickup apparatus, a method of controlling the same, and a storage medium, and more particularly to an image pickup apparatus that is capable of performing close-up shooting.

2. Description of the Related Art

In general, in an image pickup apparatus that is capable of performing the close-up shooting, depth of field is one of factors that determine whether or not a good image can be obtained, and depth of field varies with shooting magnification and aperture. For this reason, there has been proposed an image pickup apparatus that performs exposure control while taking into account depth of field which is dependent on shooting magnification.

The proposed image pickup apparatus is configured to determine an optimum aperture value based on shooting magnification information determined by a shooting magnification-determining section (see e.g. Japanese Patent Laid-Open Publication No. H02-153330).

However, in a case where shooting magnification is high, if the aperture is increased, the depth of field becomes too low, and hence only a small part of the object comes into focus even when the image pickup apparatus focuses on the object. If the aperture is reduced to increase depth of field, an exposure amount reduced by the reduction of the aperture is compensated for by reduction of a shutter speed. As a result, a camera shake and a motion blur are liable to occur, increasing the possibility that an image photographed by close-up shooting is blurred.

SUMMARY OF THE INVENTION

The present invention provides an image pickup apparatus that reduces a camera shake and a motion blur during close-up shooting performed by increasing shooting magnification and depth of field, a method of controlling the image pickup apparatus, and a storage medium.

In a first aspect of the present invention, there is provided an image pickup apparatus comprising an acquisition unit configured to acquire information on a shooting magnification, a photometric unit configured to perform photometry, and an exposure calculation unit configured to determine an aperture value and a shutter speed, based on the information on the shooting magnification acquired by the acquisition unit and a result of photometry by the photometric unit, wherein in a situation where luminance information based on the result of photometry is the same, the exposure calculation unit sets the aperture value to a larger value when the shooting magnification based on the information on the shooting magnification acquired by the acquisition unit is larger than a first value than when the shooting magnification is not larger than the first value, and in a situation where the shooting magnification is larger than the first value and the luminance information based on the result of photometry is the same, the exposure calculation unit sets the aperture value to a larger value and the shutter speed to a lower value when neither a shake of the image pickup apparatus nor a motion of an object within an imaging screen has occurred than when a shake of the image pickup apparatus or a motion of an object within the imaging screen has occurred.

In a second aspect of the present invention, there is provided a method of controlling an image pickup apparatus comprising acquiring information on a shooting magnification, performing photometry, and performing exposure calculation for determining an aperture value and a shutter speed based on the acquired information on the shooting magnification and a result of the photometry, wherein the exposure calculation includes setting, in a situation where luminance information based on the result of photometry is the same, the aperture value to a larger value when the shooting magnification based on the acquired information on the shooting magnification is larger than a first value than when the shooting magnification is not larger than the first value, and setting, in a situation where the shooting magnification is larger than the first value and the luminance information based on the result of photometry is the same, the aperture value to a larger value and the shutter speed to a lower value when neither a shake of the image pickup apparatus nor a motion of an object within an imaging screen has occurred than when a shake of the image pickup apparatus or a motion of an object within the imaging screen has occurred.

In a third aspect of the present invention, there is provided a non-transitory computer-readable storage medium storing a computer-executable program for causing a computer included in an image pickup apparatus to execute a method of controlling the image pickup apparatus, the method comprises acquiring information on a shooting magnification, performing photometry, and performing exposure calculation for determining an aperture value and a shutter speed based on the acquired information on the shooting magnification and a result of the photometry, wherein the exposure calculation includes setting, in a situation where luminance information based on the result of photometry is the same, the aperture value to a larger value when the shooting magnification based on the acquired information on the shooting magnification is larger than a first value than when the shooting magnification is not larger than the first value, and setting, in a situation where the shooting magnification is larger than the first value and the luminance information based on the result of photometry is the same, the aperture value to a larger value and the shutter speed to a lower value when neither a shake of the image pickup apparatus nor a motion of an object within an imaging screen has occurred than when a shake of the image pickup apparatus or a motion of an object within the imaging screen has occurred.

According to the present invention, when performing close-up shooting by increasing shooting magnification and depth of field, it is possible to reduce a camera shake and a motion blur.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
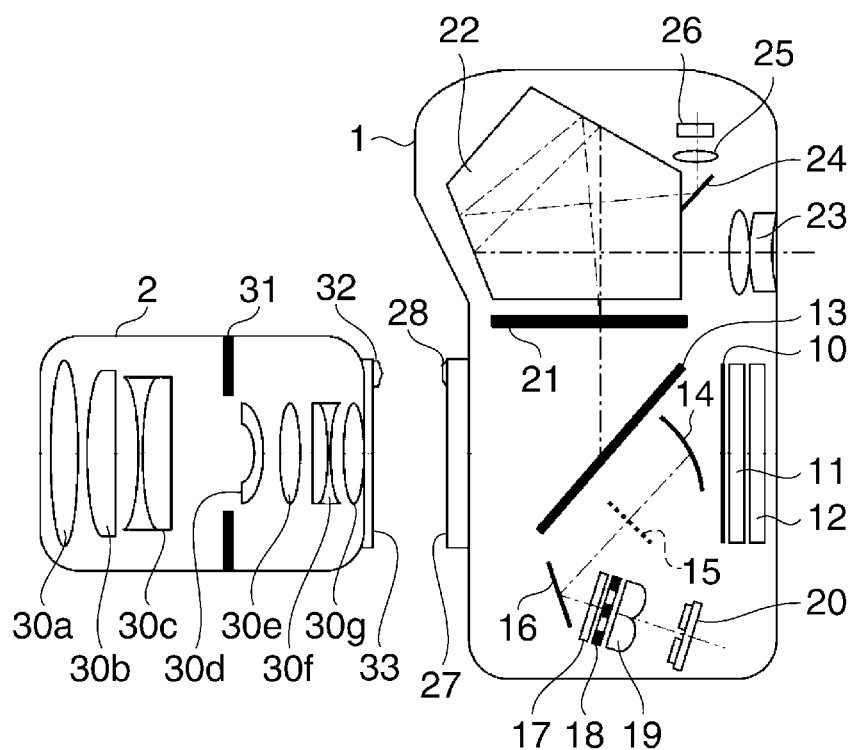
FIG. 1 is a schematic cross-sectional view of a camera as an image pickup apparatus according to a first embodiment of the present invention.

FIG. 1 is a schematic cross-sectional view of a camera as an image pickup apparatus according to a first embodiment of the present invention.

The camera shown in FIG. 1 is a so-called single-lens reflex camera with interchangeable lenses, and includes a camera body 1 and an interchangeable lens unit 2. The camera body 1 includes a mechanical shutter 10 and an optical law-pass filter 11. An image pickup device 12 is implemented e.g. by an electric charge-accumulation-type photoelectric conversion device, such as a CMOS sensor or a CCD.

Further, the camera body 1 includes a semi-transparent main mirror 13 and a first reflective mirror 14, and the semi-transparent main mirror 13 and the first reflective mirror 14 are flipped upward, as viewed in FIG. 1, during shooting. A paraxial image forming surface 15 is conjugate with an image pickup surface formed by the first reflective mirror 14. Further, the camera body 1 includes a second reflective mirror 16, an infrared blocking filter 17, a diaphragm 18 having two apertures, a secondary imaging lens 19, and a focus detecting sensor 20. The focus detecting sensor 20 is implemented e.g. by an electric charge-accumulation-type photoelectric conversion device, such as a CMOS sensor or a CCD.

Figure 2:
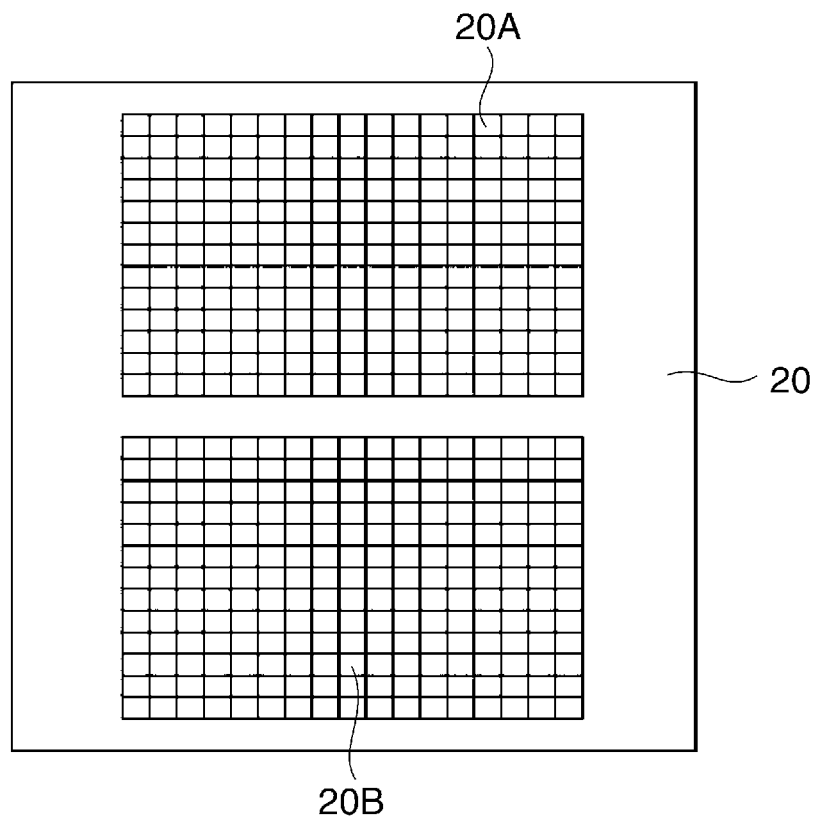
FIG. 2 is a view of an example of the arrangement of a focus detecting sensor appearing in FIG. 1.

FIG. 2 is a view of an example of the arrangement of the focus detecting sensor 20 appearing in FIG. 1.

In FIG. 2, the focus detecting sensor 20 includes incident light sensor sections 20A and 20B, which are associated with the two apertures of the diaphragm 18, respectively. The incident light sensor sections 20A and 20B are each divided into a plurality of areas.

Although not shown, the focus detecting sensor 20 is in the form of an integrated circuit in which the incident light sensor sections 20A and 20B, a signal storage section and peripheral circuitry for signal processing, and other component elements are built up on a single chip. The arrangement of components thereof from the first reflective mirror 14 to the focus detecting sensor 20 is described e.g. in Japanese Patent Laid-Open Publication No. H09-184965, and focus detection is performed by a phase difference detection method based on an image deviation amount in a desired area within an imaging screen.

Referring again to FIG. 1, the camera body 1 includes a focusing screen 21 having diffusive properties, a pentaprism 22, an eyepiece 23, a third reflective mirror 24, a collective lens 25, and a photometric sensor 26 for obtaining information on a luminance of an object.

Figure 3:
FIG. 3 is a view of an example of the arrangement of a photometric sensor appearing in FIG. 1.

FIG. 3 is a view of an example of the arrangement of the photometric sensor 26 appearing in FIG. 1.

In FIG. 3, the photometric sensor 26 is implemented e.g. by an electric charge-accumulation-type photoelectric conversion device, such as a CMOS sensor or CCD, and the photometric sensor 26 includes a plurality of pixels. Each pixel has a incident light sensor, not shown, and luminance information and color information of an object are output from each incident light sensor.

In the illustrated example, so-called primary color filters of R (red), G (green), and B (blue) are arranged in the form of a stripe. Further, the photometric sensor 26 is in the form of an integrated circuit having a signal amplifier section and peripheral circuitry for signal processing, etc. mounted on the same chip.

Referring again to FIG. 1, a finder optical system is formed by the above-mentioned focusing screen 21, pentaprism 22, and eyepiece 23. Part of off-optical axis light reflected by the main mirror 13 and then diffused by the focusing screen 21 enters the photometric sensor 26. Note that a mount section 27 is for attaching the interchangeable lens unit (also referred to as the photographic lens unit) 2 to the camera body 1, and a contact 28 is for communicating information between the interchangeable lens unit 2 and the camera body 1.

The interchangeable lens unit 2 includes optical lenses 30*a* to 30*g* forming a photographic lens. The optical lens 30*f* is a shift lens that is capable of being shifted in two mutually-intersecting directions which are orthogonal to (intersect with) a photographic optical axis (simply referred to as the optical axis), when performing correction of camera-shake blur. The interchangeable lens unit 2 further includes a diaphragm 31, a contact 32 for communicating information with the camera body 1, and a mount 33 for mounting the interchangeable lens unit 2 to the camera body 1.

Figure 4:
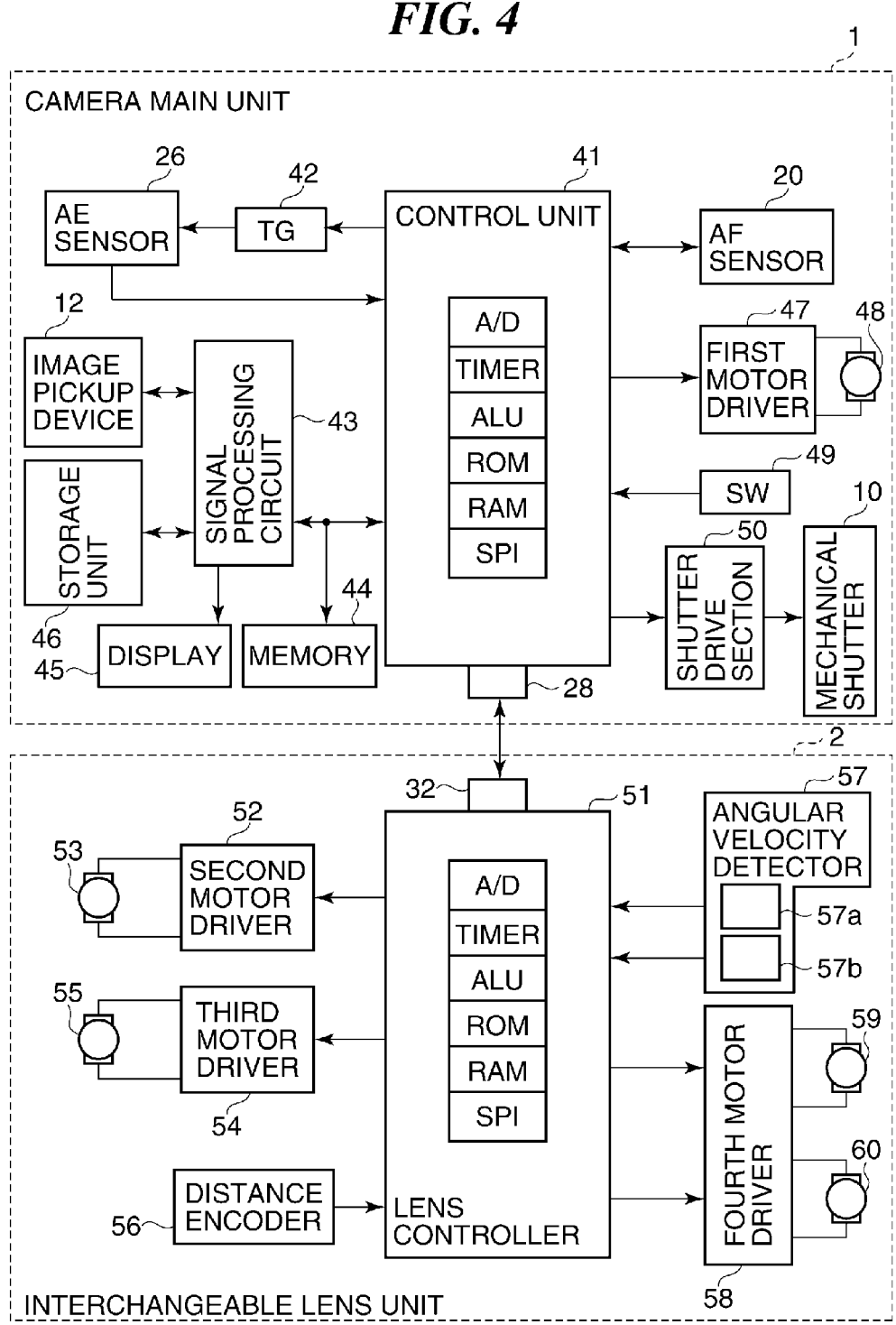
FIG. 4 is a block diagram of an example of a control circuit in the camera shown in FIG. 1.

FIG. 4 is a block diagram of an example of a control circuit in the camera shown in FIG. 1.

The camera body 1 includes a controller 41 which controls the overall operation of the camera. The controller 41 is implemented by a one-chip microcomputer incorporating an ALU (arithmetic and logic unit: calculation unit), a ROM, a RAM, an analog-to-digital converter, a timer, a serial communication port (SPI), and so forth. The control performed by the controller 41 will be described hereinafter.

Signals (a focus detection signal and a photometric signal) output from the above-mentioned focus detecting sensor (AF sensor) 20 and the photometric sensor (AE sensor) 26 are input to an input terminal of the analog-to-digital converter. Under the control of the controller 41, a timing generator (TG) 42 generates e.g. a timing signal for controlling accumulation and reading of electric charges in the photometric sensor 26.

Under the control of the controller 41, a signal processing circuit 43 controls the image pickup device 12, and acquires an image signal by subjecting an image pickup signal output from the image pickup device 12 to analog-to-digital conversion and then subjecting the digital signal to image processing. Further, the signal processing circuit 43 performs image processing, such as compression, on the image signal, which is required when recording the image signal. A memory 44 is e.g. a DRAM, and is used as a work memory when the signal processing circuit 43 performs signal processing. The memory 44 is also used as a VRAM when an image is displayed on a display device 45, referred to hereinafter.

The display device 45 is implemented e.g. by a liquid crystal panel, and displays various types of shooting information and picked-up images. The display device 45 is controlled by the controller 41. A storage section 46 is implemented e.g. by a flash memory or an optical disk, and stores the image signal on which image processing is performed by the signal processing circuit 43, as image data.

A first motor driver 47 is connected to an output terminal, not shown, of the controller 41, and drives, under the control of the controller 41, a first motor 48 for moving up/down the main mirror 13 and the first reflective mirror 14 and performing mechanical charge of the mechanical shutter 10. An external operation switch (SW) 49 is used by a user for operating the camera. The external operation switch 49 includes a release switch for instructing the start of shooting, a live view start switch for starting a live view display, and so forth.

The serial communication port of the controller 41 is connected to the contact 28. A shutter drive section 50 is connected to an output terminal, not shown, of the controller 41 to drive the mechanical shutter 10 under the control of the controller 41.

The interchangeable lens unit 2 includes a lens controller 51, which is implemented by a one-chip microcomputer incorporating an ALU, a ROM, a RAM, a timer, a serial communication port (SPI), and so forth. A second motor driver 52 is connected to an output terminal, not shown, of the lens controller 51 to drive a second motor 53 for performing focus adjustment under the control of the lens controller 51. A third motor driver 54 is connected to an output terminal, not shown, of the lens controller 51 to drive a third motor 55 for controlling the diaphragm 31 under the control of the lens controller 51.

A distance encoder 56 is an encoder for acquiring information on an amount of extension of a focus adjustment lens, i.e. an object distance, and is connected to an input terminal, not shown, of the lens controller 51. An angular velocity detector 57 is implemented e.g. by a vibrating gyroscope, and includes a detector 57a which detects an angular velocity in the vertical direction and a detector 57b which detects an angular velocity in the horizontal direction. Outputs from the angular velocity detector 57 are input to analog-to-digital conversion input terminals, not shown, of the lens controller 51.

A fourth motor driver 58 drives a fourth motor 59 for shifting the above-mentioned shift lens 30f in the vertical direction under the control of the lens controller 51, and a fifth motor 60 for shifting the shift lens 30f in the horizontal direction under the control of the lens controller 51.

The lens controller 51 converts output signals from the angular velocity detector 57 to digital signals and subjects the digital signal to integration calculation to thereby calculate angular displacements of the interchangeable lens unit 2, i.e. angles of tilt of the lens due to a camera shake in the vertical direction and the horizontal direction. Further, the lens controller 51 calculates amounts of shift of the shift lens 30f required to be performed in the vertical direction and the horizontal direction so as to correct the angles of tilt of the interchangeable lens unit 2. The lens controller 51 controls the fourth motor driver 58 to shift the shift lens 30f based on the calculated shift amounts to thereby perform the correction operation for reducing the camera shake. The serial communication port of the lens controller 51 is connected to the contact 32.

The attachment of the interchangeable lens unit 2 to the camera body 1 causes the contacts 28 and 32 to be connected to each other, which enables the lens controller 51 to perform data communication with the controller 41. Optical information specific to the lens, information on the object distance, and the like, which are required for the controller 41 to perform focus detection and exposure calculation, are sent from the lens controller 51 to the controller 41 by the data communication.

Further, the focus adjustment information and the aperture information acquired by the controller 41 are sent from the controller 41 to the lens controller 51 by the data communication. Then, the lens controller 51 controls the second motor driver 52 according to the focus adjustment information, and controls the third motor driver 54 according to the aperture information. Further, when the lens controller 51 receives a request for transmitting camera-shake information from the controller 41, the lens controller 51 sends the camera-shake information to the controller 41 by the data communication.

Figure 5:
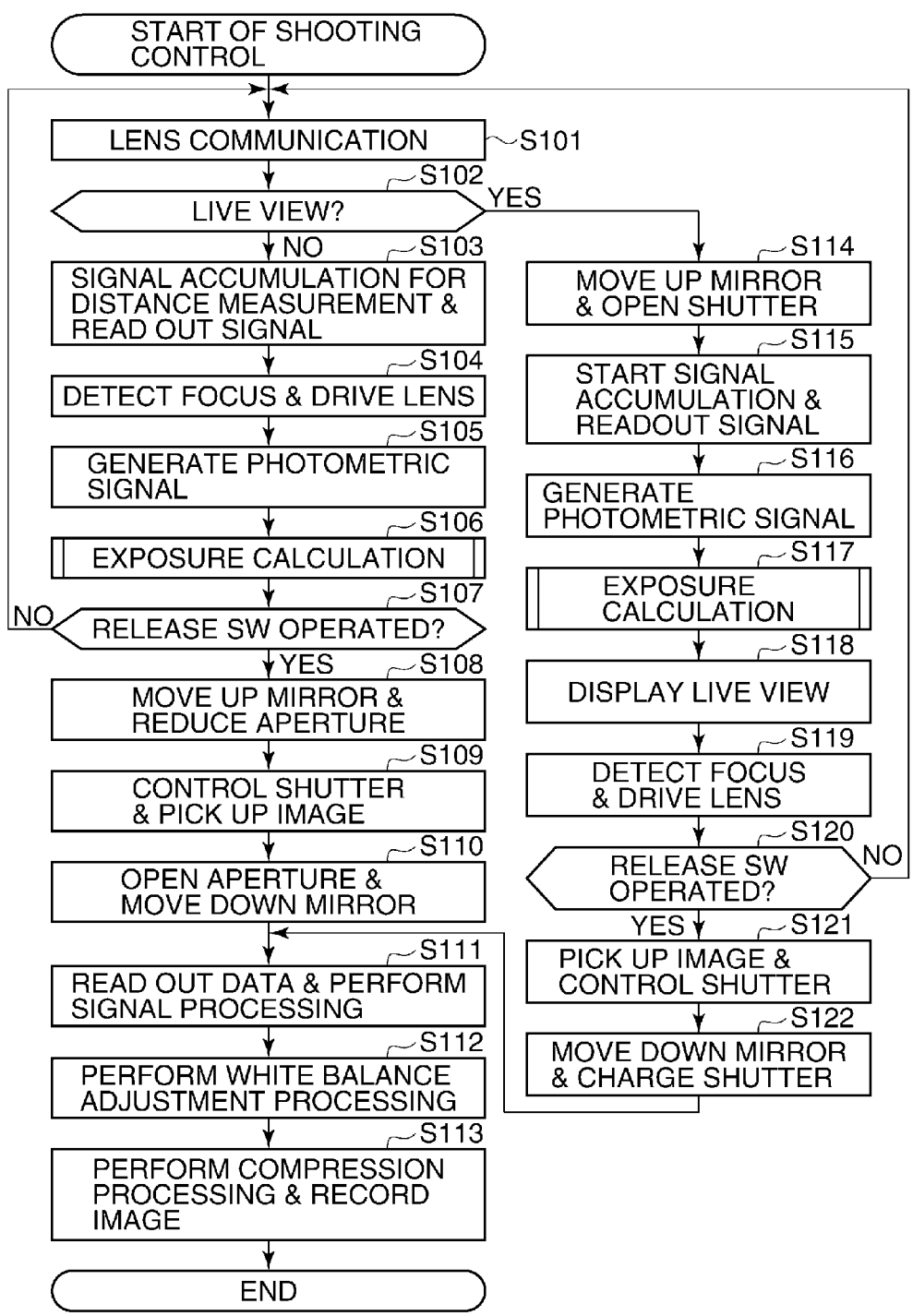
FIG. 5 is a flowchart of a shooting control process executed by a controller appearing in FIG. 4.

FIG. 5 is a flowchart of a shooting control process executed by the controller 41 appearing in FIG. 4.

Now, when a power switch (not shown) provided on the camera body 1 is switched on, the controller 41 is made operable. When the controller 41 is made operable, the controller 41 communicates with the lens controller 51 to acquire lens information of various kinds of lenses required for distance measurement and photometry (step S101: lens communication).

Then, the controller 41 checks whether or not the live view start switch (LV) of the external operation switch 49 has been operated (step S102). If the live view start switch (LV) has not been operated (NO to the step S102), the controller 41 controls the focus detecting sensor 20 to accumulate a signal, and when the signal accumulation has been finished, the controller 41 reads out the signal accumulated in the focus detecting sensor 20, and subjects the signal to analog-to-digital conversion (step S103). Then, the controller 41 performs data correction, such as shading, on the digital data obtained as a result of analog-to-digital conversion.

Next, the controller 41 determines a focus state of an imaging screen according to the lens information and the digital data acquired from the focus detecting sensor 20. Then, the controller 41 determines an area on the imaging screen where the lens is to be focused. Note that if the area has been designated by the user in advance, the controller 41 may determine the area according to the user's designation.

Then, the controller 41 calculates an amount of shift of the lens required for the lens to be focused according to the focus state in the determined area (focus area). Then, the controller 41 sends the lens shift amount to the lens controller 51. The lens controller 51 controls the second motor driver 52 according to the lens shift amount to drive the second motor 53 to thereby drive the focus adjustment lens (step S104).

This causes the photographic lens to be focused on the object in the determined area. An output from the distance encoder 56 is changed by driving the focus adjustment lens, and hence the lens controller 51 updates the lens information.

Then, the controller 41 performs accumulation control and signal reading control of the photometric sensor 26 by controlling the timing generator 42 (step S105). By this control, the photometric sensor 26 performs accumulation of electric charges during a predetermined time period. Then, the controller 41 sequentially reads out the accumulated signals from the plurality of pixels, subjects the read signals to analog-to-digital conversion, and the stores the digital signals in the memory 44 as photometric data.

The controller 41 performs addition of the photometric data stored in the memory 44 separately for the colors of R, G, and B for each of the plurality of divided areas (photometric area) to thereby calculate $R(i)$, $G(i)$, and $B(i)$ as respective results of addition.

In this calculation, assuming that the number of the plurality of photometric areas is 256 (16×16), i=1 to 256 holds.

Then, the controller 41 performs matrix calculation on R(i), G(i), and B(i) by the following equation (1) using predetermined coefficients (M11 to M33) to thereby calculate object luminance information Br(i) and object color information Cx(i) and Cy(i) each in a linear system for each of the 256 photometric areas:

$$\begin{bmatrix} Br(i) \\ Cx(i) \\ Cy(i) \end{bmatrix} = \begin{bmatrix} M11, M12, M13 \\ M21, M22, M23 \\ M31, M32, M33 \end{bmatrix} \times \begin{bmatrix} R(i) \\ G(i) \\ B(i) \end{bmatrix} \quad (1)$$

The controller 41 further converts the object luminance information Br(i) in the linear system for each of the 256 photometric areas to that in a logarithmic compression system to the base 2 using a transformation function. Then, the controller 41 performs correction processing (S) for correcting the luminance information in each photometric area based on optical characteristics, such as lens information, to thereby calculate the object luminance information B(i) in the logarithmic compression system by the following equation (2):

$$B(i) = \log_2 \{Br(i)\} \times S(i) \quad (2)$$

The above-described accumulation control and signal reading control for the photometric sensor 26 are periodically executed at time intervals defined in advance, and the controller 41 executes the control using the timer.

The controller 41 performs exposure calculation according to the object luminance information B(i) of each photometric area acquired as described above, and determines a shutter speed (exposure time of the image pickup device 12), an aperture value, and an imaging sensitivity, which are suitable for shooting (step S106). The exposure calculation will be described hereinafter.

Next, the controller 41 checks whether or not the release switch of the external operation switch 49 has been operated (step S107). If the release switch has not been operated (NO to the step S107), the controller 41 returns to the step S101.

On the other hand, if the release switch has been operated (YES to the step S107), the controller 41 controls the first motor driver 47 to drive the first motor 48 to move up (flip up) the main mirror 13 and the first reflective mirror 14. Then, the controller 41 sends the aperture value information acquired in the step S106 to the lens controller 51 (step S108).

The lens controller 51 controls the third motor driver 54 to drive the third motor 55 according to the received aperture value information. This places the photographic lens in a state with a stopped-down aperture (step S108).

Next, the controller 41 controls the shutter drive section 50 to open the mechanical shutter 10. This causes light incident through the photographic lens to enter the image pickup device 12, whereby an image pickup operation is performed (step S109). In doing this, the controller 41 controls the signal processing circuit 43 to perform signal accumulation by setting an accumulation time corresponding to the shutter speed acquired in the step S106 and a read-out gain corresponding to a predetermined imaging sensitivity, to the image pickup device 12.

When the image pickup operation is finished, the controller 41 controls the shutter drive section 50 to cause the mechanical shutter 10 to block light. As a consequence, light entering the image pickup device 12 from the photographic lens is blocked.

Then, the controller 41 instructs the lens controller 51 to open the diaphragm 31. According to this instruction, the lens controller 51 controls the third motor driver 54 to drive the third motor 55 to make the aperture of the photographic lens open. Further, the controller 41 controls the first motor driver 47 to drive the first motor 48 to move down the main mirror 13 and the first reflective mirror 14, and mechanically charge the mechanical shutter 10 (step S110).

Next, under the control of the controller 41, the signal processing circuit 43 reads out the image pickup signal from the image pickup device 12, subjects the image pickup signal to analog-to-digital conversion, and then performs necessary correction processing and interpolation processing on the converted signal (step S111). Under the control of the controller 41, the signal processing circuit 43 further performs white balance adjustment processing on the image pickup signal (step S112).

For example, the signal processing circuit 43 divides one screen of the image pickup signal into a plurality of areas, and extracts a white area of the object based on a color-difference signal for each area. Further, the signal processing circuit 43 performs gain correction for a red channel and a blue channel of the entire screen based on the signal of the extracted white area to thereby perform white balance adjustment.

Then, under the control of the controller 41, the signal processing circuit 43 subjects the image signal on which the white balance adjustment has been performed to compression transformation to thereby store resulting data having a recording file format, as image data, in the storage section 46 (step S113). Then, as soon as the image data is stored in the storage section 46, the controller 41 terminates the control.

In the step S102, if the live view start switch has been operated (YES to the step S102), the controller 41 controls the first motor driver 47 to drive the first motor 48 to move up the main mirror 13 and the first reflective mirror 14. Then, the controller 41 controls the shutter drive section 50 to open the mechanical shutter 10 (step S114). As a consequence, light incident through the photographic lens enters the image pickup device 12, thereby enabling an image to be picked up.

Under the control of the controller 41, the signal processing circuit 43 performs signal accumulation by setting a predetermined accumulation time and a read-out gain corresponding to a predetermined imaging sensitivity, to the image pickup device 12. This starts an image pickup operation. Then, the signal processing circuit 43 sequentially reads out the image pickup signal from the image pickup device 12 (step S115).

The signal processing circuit 43 performs addition of the image pickup signals separately for the colors of R, G, and B for each of the plurality of divided areas (photometric area) to thereby calculate R(i), G(i), and B(i). In this calculation, assuming that the predetermined number of the plurality of photometric areas is 256 (i=1 to 256), the signal processing circuit 43 calculates object luminance information Br(i) and object color information Cx(i) and Cy(i) each in a linear system for each of the 256 photometric areas by the above equation (1).

Further, the signal processing circuit 43 determines the object luminance information B(i) in a logarithmic compression system by the above equation (2) (step S116). The accumulation control and the signal reading control for the image pickup device 12 for acquiring the object luminance information are repeatedly executed according to the frame rate of a moving image.

Then, the controller 41 performs exposure calculation according to the object luminance information B(i) for each of the 256 photometric areas etc., and determines a shutter speed, an aperture value, and an imaging sensitivity, which are suitable for shooting (step S117). Further, the controller 41 sends the aperture value information to the lens controller 51. The lens controller 51 controls the third motor driver 54 to drive the third motor 55 according to the aperture value information. This places the photographic lens in a state with a stopped-down aperture.

Under the control of the controller 41, the signal processing circuit 43 subjects the image pickup signals read out in the step S115 to development processing such that an image formed thereby is suitable for the live view display. Then, the signal processing circuit 43 writes the image subjected to the development processing in the VRAM area of the memory 44, and displays the image on the display device 45 (step S118). This operation is repeatedly performed in synchronism with the predetermined frame rate, and the picked-up image is displayed on the display device 45.

Subsequently, the controller 41 acquires a signal indicative of the focus state (focus state signal) from the signal processing circuit 43 out of the image pickup signals read out in the step S115. The controller 41 instructs the interchangeable lens unit 2 to drive the lens while monitoring the focus state signal. Upon receipt of the instruction, the lens controller 51 controls the second motor driver 52 to drive the second motor 53.

If it is determined from the focus state signal that the object is in focus, the controller 41 instructs the interchangeable lens unit 2 to stop driving of the lens. In response to the instruction, the lens controller 51 controls the second motor driver 52 to stop the second motor 53 (step S119).

Next, the controller 41 checks whether or not the release switch of the external operation switch 49 has been operated (step S120). If the release switch has not been operated (NO to the step S120), the controller 41 returns to the step S101.

On the other hand, if the release switch has been operated (YES to the step S120), under the control of the controller 41, the signal processing circuit 43 performs signal accumulation by setting an accumulation time corresponding to the shutter speed acquired in the step S117 and a read-out gain corresponding to a predetermined imaging sensitivity, to the image pickup device 12. This causes an image pickup operation to be performed.

When the image pickup operation is finished, the controller 41 controls the shutter drive section 50 to cause the mechanical shutter 10 to block light (step S121). As a consequence, light entering the image pickup device 12 from the photographic lens is blocked.

Next, the controller 41 drives the first motor driver 47 to drive the first motor 48 to move down the main mirror 13 and the first reflective mirror 14, and mechanically charge the mechanical shutter 10 (step S122). Then, the controller 41 proceeds to the step S111.

Next, details of the exposure calculation executed in the steps S106 and S117 in FIG. 5 will be described.

Figure 6:
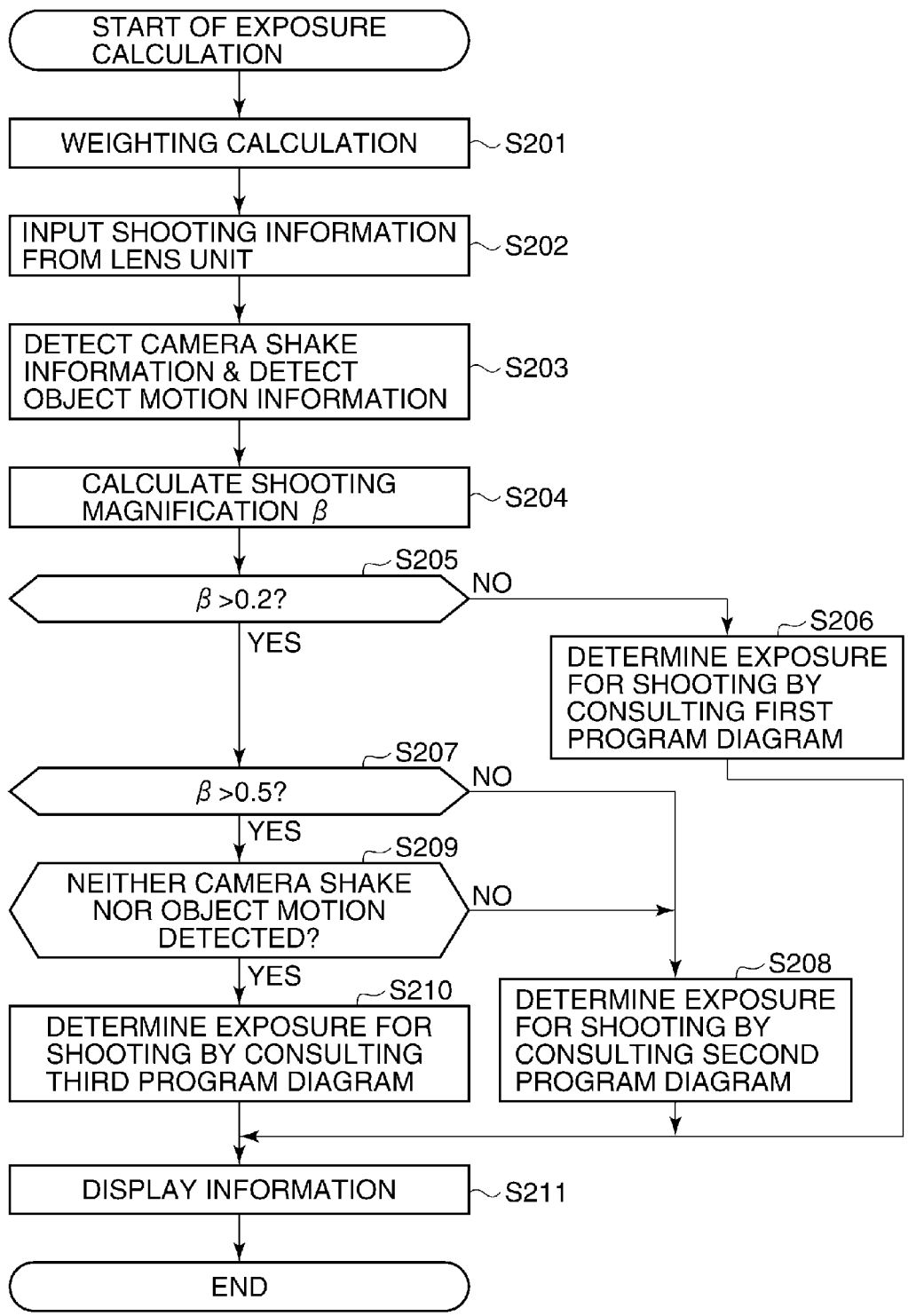
FIG. 6 is a flowchart of an exposure calculation process executed in a step in FIG. 5.

FIG. 6 is a flowchart of an exposure calculation process executed in the steps S106 and S117 in FIG. 5. The exposure calculation process is executed by the controller 41.

When the exposure calculation is started, the controller 41 performs predetermined weighting calculation on the object luminance information B(i) in the logarithmic compression system for each photometric area to thereby determine the object luminance information Be for exposure control, by the following equation (3) (step S201):

$$Be = W(i) \times B(i) \quad (3)$$

Note that a weighting coefficient W(i) is set to be large in a central portion of the screen where the main object is likely to be present and a focus detecting area, and to be small in the other areas. Further, the total sum of W(i) is set to be equal to 1.

Then, the controller 41 acquires shooting information, such as information on the focal length of the photographic lens and information on the distance to the object, from the lens controller 51 (step S202). The controller 41 performs detection of camera-shake information and information on the motion of the object, based on the object luminance information B(i) in the logarithmic compression system for each photometric area (step S203).

As described above, the controller 41 periodically and repeatedly acquires the object luminance information B(i) in the logarithmic compression system for each photometric area. Therefore, the controller 41 performs detection of the camera-shake information and information on the motion of the object, by determining correlation between the latest object luminance information B(i) and the object luminance information B(i) acquired before the latest one.

Note that a method of detecting a motion vector by performing pattern matching or the like according to picked-up image information items which are different in time, to thereby detect a motion of an object as a shooting target is well known, and hence description thereof is omitted.

Here, out of the plurality of photometric areas, a photometric area in the vicinity of the center (e.g. an area of 10×10) including the central portion of the screen or an area where the focus detection has been performed, is regarded as an area where the main object is likely to exist. Then, the object motion information is detected based on correlation information of the area.

On the other hand, the other photometric areas are regarded not as an area where the main object is likely to exist, but as an area which is likely to be background. Then, the camera-shake information is detected based on the correlation information of the areas. Note that in detecting the camera-shake information, a result of detection by the angular velocity detector 57, acquired in the step S202, is taken into account.

Next, the controller 41 calculates a shooting magnification β based on information concerning the shooting magnification, such as the information on the focal length and the information on the distance to the object (step S204). When the interchangeable lens unit 2 is a whole extension type lens, the shooting magnification β is calculated by the following equation (4) by setting the focal length to f and the distance to the object to D:

$$\beta = f \div D \quad (4)$$

Note that depending on the arrangement of the lens, there is a case where the correct shooting magnification cannot be calculated by the equation (4). In this case, the controller 41 may be configured to acquire information concerning the shooting magnification from the interchangeable lens unit 2, and further may be configured to be provided with e.g. a conversion table for calculating the shooting magnification.

Then, the controller 41 checks whether or not the shooting magnification β is larger than a predetermined second value (e.g. 0.2) (step S205). If the shooting magnification β is not larger than the second value (NO to the step S205), the controller 41 selects a first program diagram as a program diagram for use in the exposure calculation. Then, the controller 41 determines a shutter speed Tv, an aperture value Av, and an imaging sensitivity Sv for shooting, by consulting the first program diagram according to the object luminance information Be (step S206).

Figure 7:
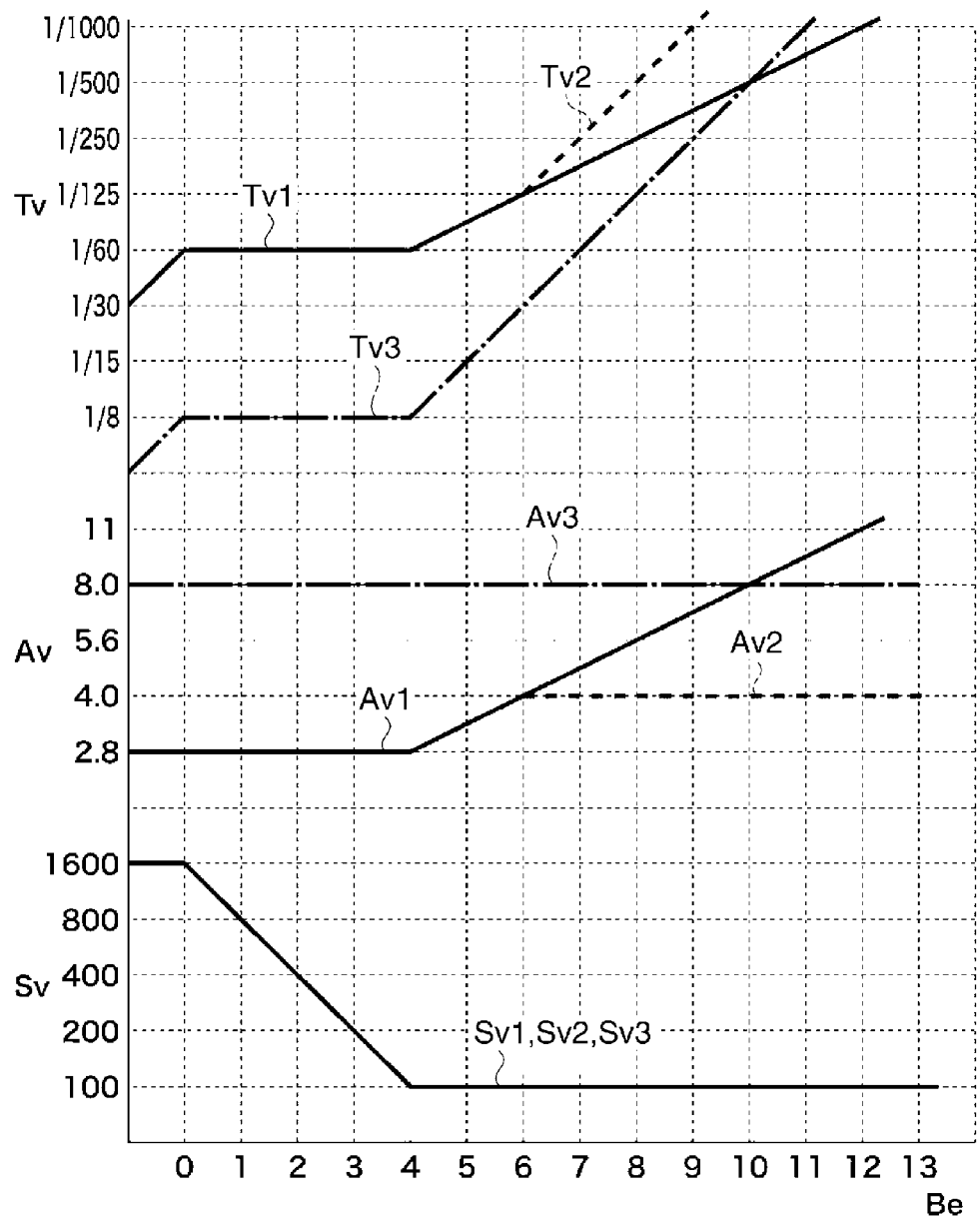
FIG. 7 is a diagram showing an example of program diagrams used by the controller shown in FIG. 4.

FIG. 7 is a diagram showing an example of the program diagrams used by the controller 41 shown in FIG. 4.

In FIG. 7, the horizontal axis represents the object luminance information Be, and corresponding parts of the vertical axis represent the shutter speed Tv, the aperture value Av, and the shooting sensitivity Sv, respectively. A shutter speed Tv1, an aperture value Av1, and a shooting sensitivity Sv1 indicated by solid lines form the first program diagram, and the first program diagram is for a general shooting scene which is not to be shot by close up.

Note that the program diagram defines relationships between the object luminance, and the shutter speed, the aperture value, and the shooting sensitivity.

In the first program diagram, when the object luminance information Be is not larger than 0 (third object luminance), the shooting sensitivity Sv1 is set to 1600. When the object luminance information Be is larger than 0 and smaller than 4 (smaller than a fifth object luminance), the shooting sensitivity Sv1 is set such that a value thereof is lowered by one step as the object luminance information Be becomes larger by one step. When the object luminance information Be is larger than 4, the shooting sensitivity Sv1 is set to 100.

When the object luminance information Be is not larger than 4, the aperture value Av1 is set to 2.8. When the object luminance information Be is larger than 4, the aperture value Av1 is set such that the aperture is narrowed by one step as the object luminance information Be becomes larger by two steps.

When the object luminance information Be is not smaller than 0 and not larger than 4, the shutter speed Tv1 is set to 1/60 second. When the object luminance information Be is smaller than 0, the shutter speed Tv1 is set such that a value thereof is lowered by one step as the object luminance information Be becomes smaller by one step. When the description is given in terms of exposure time, as the object luminance information Be becomes smaller by one step, the exposure time of the image pickup device 12 is set to a value larger by one step. When the object luminance information Be is larger than 4, the shutter speed Tv1 is set such that a value thereof becomes higher by one step as the object luminance information Be becomes larger by two steps. When the description is given in terms of exposure time, as the object luminance information Be becomes larger by two steps, the exposure time of the image pickup device 12 is set to a value smaller by one step.

If the shooting magnification β is larger than the second value (YES to the step S205), the controller 41 checks whether or not the shooting magnification β is larger than a predetermined first value (e.g. 0.5) (step S207). If the shooting magnification β is not larger than the first value (NO to the step S207), the controller 41 determines the shutter speed Tv, the aperture value Av, and the shooting sensitivity Sv for shooting, by consulting a second program diagram according to the object luminance information Be (step S208).

In FIG. 7, the shutter speed, the aperture value, and the shooting sensitivity, in the second program diagram, are represented by Tv2, Av2, and Sv2, respectively. In the second program diagram, portions different from the first program diagram (portions of the shutter speed Tv2 and the aperture value Av2 in FIG. 7) are indicated by broken lines. The second program diagram is for use in the close-up shooting performed at a shooting magnification of approximately 0.2 to 0.5.

The shooting sensitivity Sv2 in the second program diagram is set to the same value as that of the shooting sensitivity Sv1 in the first program diagram. As for the aperture value Av2, when the object luminance information Be is smaller than 6 (smaller than a first object luminance), it is set to the same value as that of the aperture value Av1 in the first program diagram. When the object luminance information Be is larger than 6, the aperture value Av2 is set to 4.0 as indicated by a broken line.

As for the shutter speed Tv2, when the object luminance information Be is not larger than 6, it is set to the same value as that of the shutter speed Tv1 in the first program diagram. When the object luminance information Be is larger than 6, the shutter speed Tv2 is set to a value which increases at such a rate that it becomes higher by one step as the object luminance information Be becomes larger by one step, as indicated by a broken line.

In the second program diagram, the aperture value Av2 is set to a value within a range not smaller than 2.8 and not larger than 4.0, and hence it is possible to obtain a shooting result with relatively shallow depth of field. In the close-up shooting at a shooting magnification approximately larger than 0.2 and not larger than 0.5, a setting of a not very large depth of field makes it more likely that it is possible to photograph an image in which a main object part in focus and a background part out of focus are properly made different from each other. Therefore, in the close-up shooting at a shooting magnification of approximately larger than 0.2 and not larger than 0.5, the second program diagram is selected.

If the shooting magnification β is larger than the first value (YES to the step S207), the controller 41 checks based on the camera-shake information and the object motion information whether or not neither a camera shake nor a motion of the object has occurred (step S209). If a camera shake or a motion of the object has occurred (NO to the step S209), the controller 41 proceeds to the step S208 to determine the shutter speed Tv, the aperture value Av, and the shooting sensitivity Sv, for shooting (i.e. shooting exposure) according to the second program diagram.

On the other hand, if neither a camera shake nor a motion of the object has been detected (YES to the step S209), the controller 41 determines the shutter speed Tv, the aperture value Av, and the shooting sensitivity Sv for shooting, by consulting a third program diagram (third table) according to the object luminance information Be (step S210).

In FIG. 7, the shutter speed, the aperture value, and the shooting sensitivity, in the third program diagram, are represented by Tv3, Av3, and Sv3, respectively. In the third program diagram, portions different from the first program diagram are indicated by dashed-dotted lines (portions of the shutter speed Tv3 and the aperture value Av3 in FIG. 7).

The shooting sensitivity Sv3 in the third program diagram is set to the same value as that of the shooting sensitivity Sv1 in the first program diagram. As for the aperture value Av3, it is always set to 8.0 (i.e. set to a fixed value) as indicated by the dashed-dotted line.

As for the shutter speed Tv3, when the object luminance information Be is not smaller than 0 and not larger than 4, it is set to 1/8. When the object luminance information Be is smaller than 0, the shutter speed Tv3 is set to a value which decreases at such a rate that it becomes lower by one step as the object luminance information Be becomes smaller by one step. When the object luminance information Be is larger than 4, the shutter speed Tv3 is set to a value which increases at such a rate that it becomes higher by one step as the object luminance information Be becomes larger by one step.

As shown in FIG. 7, when the object luminance information Be is larger than 10 (second object luminance), the aperture value Av1 becomes larger than the aperture value Av3 (i.e. the aperture is narrowed). Further, when the object luminance information Be is larger than 10, the shutter speed Tv3 becomes higher than the shutter speed Tv1.

In the third program diagram, since the aperture value Av3 is always set to 8.0, it is possible to obtain a shooting result with a relatively large depth of field. In the close-up shooting at a shooting magnification of larger than 0.5, a setting of a large depth of field makes it more likely that it is possible to photograph an image in which an entire main object is in focus. Therefore, in the close-up shooting at a shooting magnification of larger than 0.5, the third program diagram is selected.

However, when the aperture is reduced, the shutter speed is reduced, and hence it is more likely that a camera shake or a motion blur of the moving object occurs, which increases the possibility that a sharp image cannot be obtained. Therefore, when the shooting magnification is larger than the first value (0.5), the third program diagram is not necessarily selected, but as described above, after checking that neither a camera shake nor a motion blur of the object has occurred, the third program diagram is selected.

Note that the first to third program diagrams are stored e.g. in the ROM appearing in FIG. 4 in advance.

When one of the steps S206, S208, and S210 is terminated, the controller 41 controls the signal processing circuit 43 to display the shutter speed Tv, the aperture value Av, and the shooting sensitivity Sv, for shooting, determined as described above, on the display device 45 (step S211). Then, the controller 41 terminates the exposure calculation.

By the way, the example of the third program diagram described with reference to FIG. 7 may be replaced by another example thereof.

Figure 8:
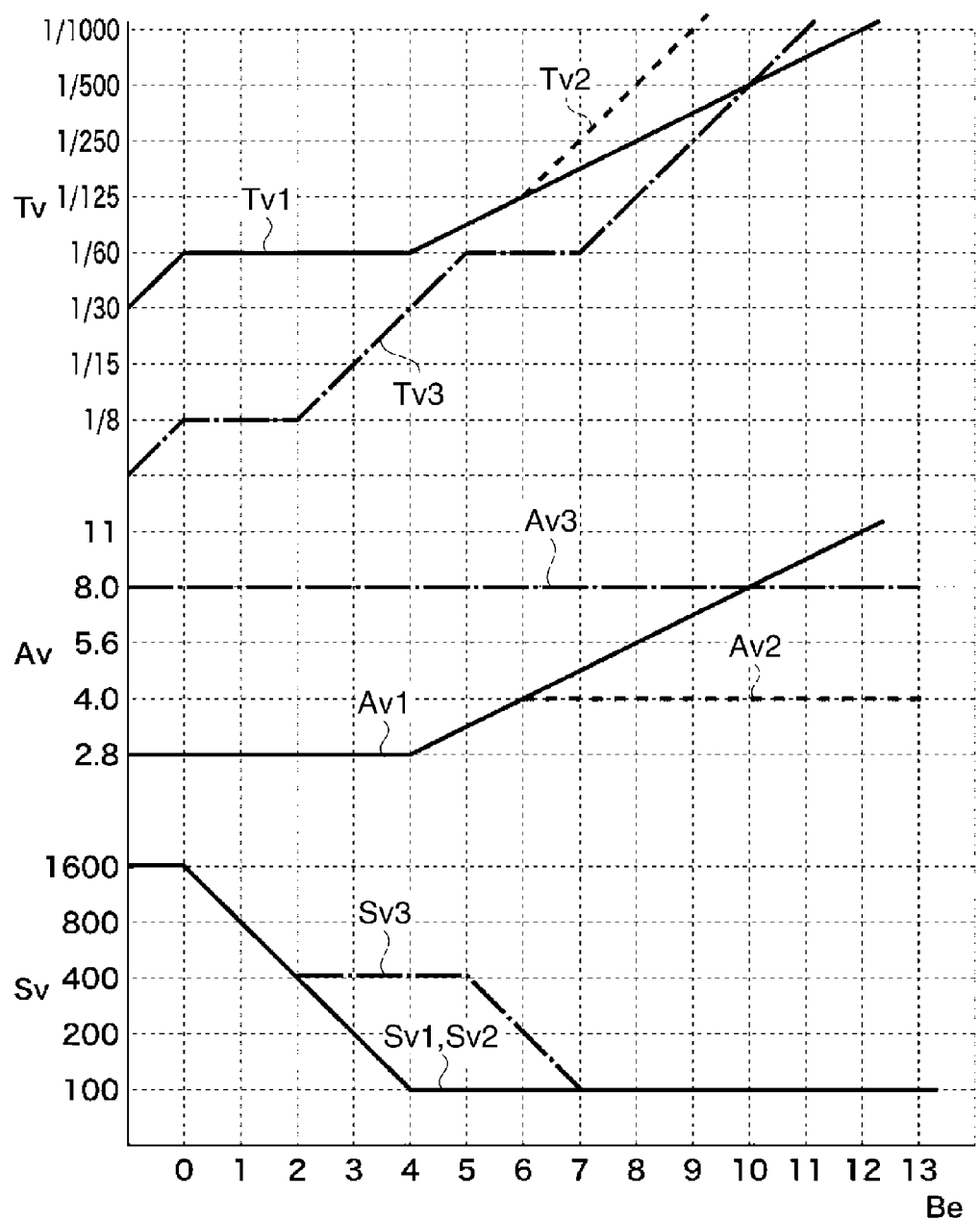
FIG. 8 is a diagram useful in explaining another example of a third program diagram used by the controller shown in FIG. 4.

FIG. 8 is a diagram useful in explaining the other example of the third program diagram used by the controller 41 appearing in FIG. 4. Note that the first and second program diagrams in FIG. 8 are the same as those shown in FIG. 7.

In FIG. 8, the horizontal axis represents the object luminance information Be, and the vertical axis represents the shutter speed Tv, the aperture value Av, and the shooting sensitivity Sv. In the third program diagram, when the object luminance information Be is not smaller than 2 and not larger than 7, the shooting sensitivity Sv is set to values different from those in the first program diagram.

When the object luminance information Be is not smaller than 2 and not larger than 5, the shooting sensitivity Sv3 is set to 400 as indicated by a dashed-dotted line. Further, when the object luminance information Be is larger than 5 and not larger than 7, the shooting sensitivity Sv3 is set to a value which decreases at such a rate that it becomes lower by one level as the object luminance information Be becomes larger by one step. The aperture value Av3 is always set to 8.0 similarly to FIG. 7.

As for the shutter speed Tv3, when the object luminance information Be is not smaller than 0 and not larger than 2, it is set to 1/8 seconds. When the object luminance information Be is smaller than 0, the shutter speed Tv3 is set to a value which decreases at such a rate that it becomes lower by one step as the object luminance information Be becomes smaller by one step. When the object luminance information Be is larger than 2 and not larger than 5, the shutter speed Tv3 is set to a value which increases at such a rate that it becomes higher by one step as the object luminance information Be becomes larger by one step. When the object luminance information Be is larger than 5 and not larger than 7, the shutter speed Tv3 is set to 1/60 seconds. When the object luminance information Be is larger than 7, the shutter speed Tv3 is set to a value which increases at such a rate that it becomes higher by one step as the object luminance information Be becomes larger by one step.

Also in the third program diagram shown in FIG. 8, since the aperture value Av3 is always set to 8.0, it is possible to obtain a shooting result with a relatively large depth of field. Therefore, the third program diagram is suitable for the close-up shooting at a shooting magnification of larger than 0.5.

Compared with the program diagram described with reference to FIG. 7, in the third program diagram shown in FIG. 8, the shooting sensitivity Sv3 is set to be higher than the shooting sensitivity Sv3 shown in FIG. 7 when the object luminance information Be is larger than 2 and smaller than 7, and hence the shutter speed Tv3 is set to a value shifted toward the high-speed side.

As described above, in the first embodiment of the present invention, the first to third program diagrams each of which defines the shutter speed, the aperture value, and the shooting sensitivity, according to the object luminance information, are used, and one of them is selected according to the shooting magnification, and a camera shake and a motion of the object. Then, the shutter speed, the aperture value, and the shooting sensitivity are determined by consulting the selected program diagram according to the object luminance information.

That is, in close-up shooting, one program diagram is selected from the plurality of program diagrams according to shooting conditions, such as a shooting magnification, a camera shake, and a motion of the object, and the shutter speed, the aperture value, and the shooting sensitivity are determined by consulting the selected program diagram. More specifically, in a situation where the luminance information based on the photometric result is the same, the aperture value is set to a larger value (i.e. the aperture is narrowed) when the shooting magnification based on the acquired information concerning the shooting magnification is larger than the first value than when the shooting magnification is not larger than the first value. Further, in a situation where the shooting magnification is larger than the first value, and the luminance information is the same, the aperture value is set to a larger value (i.e. the aperture is narrowed), and the shutter speed is set to a lower value when neither a shake of the image pickup apparatus nor a motion of the object within the imaging screen has occurred than when a shake of the image pickup apparatus or a motion of the object within the imaging screen has occurred. This makes it possible to reduce a camera-shake blur and an object-motion blur in the close-up shooting by increasing the shooting magnification and the depth of field.

Further, in a situation where the luminance information based on the photometric result is the same, the aperture value is set to a larger value (i.e. the aperture is narrowed) when the shooting magnification is larger than the first value and a shake of the image pickup apparatus or a motion of the object within the imaging screen has occurred than when the shooting magnification is not larger than the second value which is smaller than the first value. This makes it possible, even in a situation where a camera shake or an object motion has occurred, to reduce a camera-shake blur and an object-motion blur in the close-up shooting by increasing the shooting magnification and the depth of field.

Note that the above-described relationship between the aperture value and the shutter speed is only required to hold when the object luminance information Be is within a predetermined range, and the predetermined range is not limited to the Be value range of 6 to 10 shown in FIGS. 7 and 8.

The third program diagrams shown in FIGS. 7 and 8 are an example, and are not limited to the above-mentioned values. For example, the aperture value may not be set to a fixed value regardless of the object luminance information Be, but it may be variable on condition that Av3 does not become smaller than Av2 and is larger than Av2 in a certain range of the object luminance information Be. Further, the Tv2 value may be equal to the Tv3 value in a certain range of the object luminance information Be, on condition that Tv3 does not become higher than Tv2 and is lower than Tv2 in the certain range of the object luminance information Be.

Next, a description will be given of a camera as an image pickup apparatus according to a second embodiment of the present invention. The camera according to the second embodiment has the same arrangement as that of the example shown in FIG. 1, and the control circuit of the camera has the same arrangement as that of the example shown in FIG. 4. Further, a shooting control process executed by the camera as the image pickup apparatus according to the second embodiment is the same as the shooting control process shown in FIG. 5 except the exposure calculation in the steps S106 and S117.

Further, in the second embodiment, in determining the shutter speed, the aperture value, and the shooting sensitivity, according to the shooting magnification, one of the first to fourth program diagrams is used.

Figure 9:
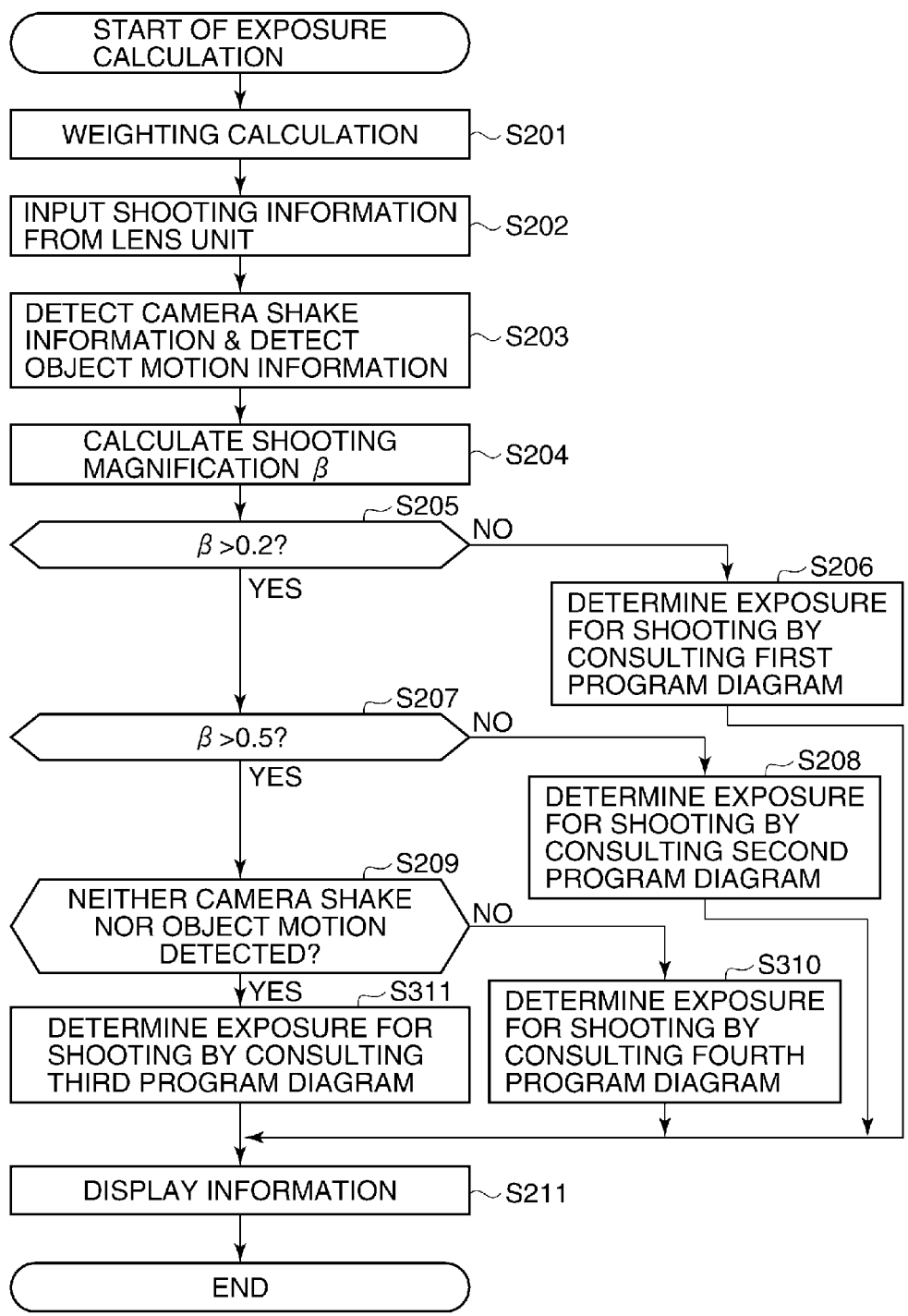
FIG. 9 is a flowchart of an exposure calculation process executed by a camera as an image pickup apparatus according to a second embodiment of the present invention.
Figure 10:
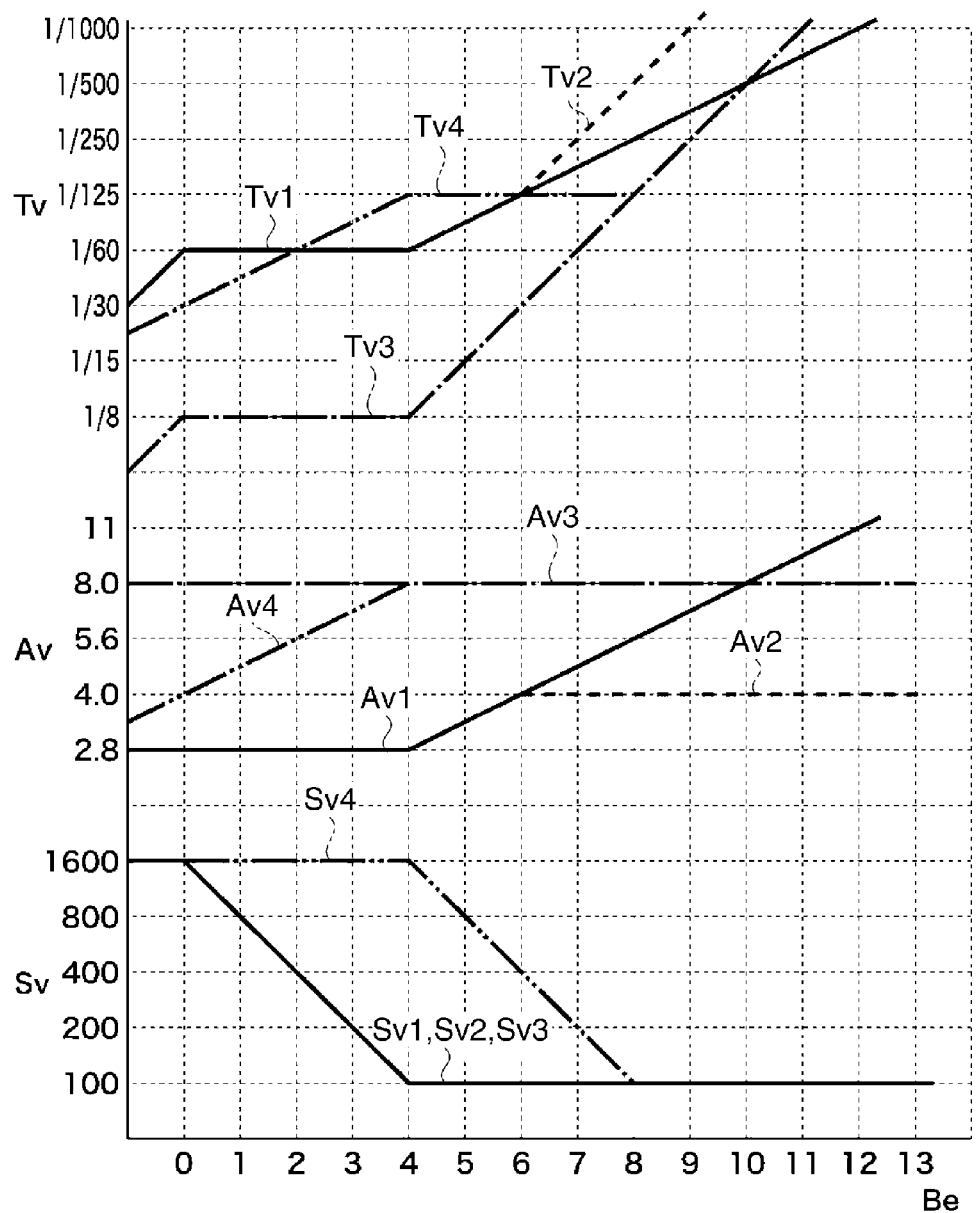
FIG. 10 is a diagram showing an example of program diagrams used by the camera as the image pickup apparatus according to the second embodiment.

FIG. 9 is a flowchart of an exposure calculation process executed in the camera as the image pickup apparatus according to the second embodiment. Further, FIG. 10 is a diagram showing an example of the program diagrams used in the camera.

In FIG. 9, the same steps as those in FIG. 6 are denoted by the same step numbers, and description thereof is omitted. Further, in FIG. 10, the first to third program diagrams are the same as the first to third program diagrams described with reference to FIG. 7, and further, a fourth program diagram indicated by a dashed-two dotted line is added in FIG. 10.

In the exposure calculation described with reference to FIG. 6, in the step S209, if a camera shake or a motion of the object has occurred (NO to the step S209), the controller 41 determines the shutter speed Tv, the aperture value Av, and the shooting sensitivity Sv, for shooting, by consulting the second program diagram. In contrast, in the second embodiment, if a camera shake or a motion of the object has occurred (NO to the step S209), the controller 41 determines the shutter speed Tv, the aperture value Av, and the shooting sensitivity Sv, for shooting, by consulting the fourth program diagram (step S310). Then, the controller 41 proceeds to a step S211.

If neither a camera shake nor a motion of the object has been detected (YES to the step S209), the controller 41 determines the shutter speed Tv, the aperture value Av, and the shooting sensitivity Sv, for shooting, by consulting the third program diagram (step S311). Then, the controller 41 proceeds to the step S211. Note that the fourth program diagram is recorded in the ROM in advance.

In FIG. 10, portions of the fourth program diagram different from the third program diagram are indicated by dashed-two dotted lines. In the fourth program diagram, when the object luminance information Be is not larger than 4, a shooting sensitivity Sv4 is set to 1600. When the object luminance information Be is larger than 4 and smaller than 8 (smaller than a fourth object luminance), the shooting sensitivity Sv4 is set to a value which decreases at such a rate that it becomes lower by one step as the object luminance information Be becomes larger by step. When the object luminance information Be is larger than 8, the shooting sensitivity Sv4 is set to 100.

Further, when the object luminance information Be is larger than 4, an aperture value Av4 is set to 8.0. When the object luminance information Be is not larger than 4, the aperture value Av4 is set to a value which decrease at such at a rate that it is smaller (cause the aperture to open) by one step as the object luminance information Be becomes smaller by two steps.

As for the shutter speed, when the object luminance information Be is larger than 4 and not larger than 8, a shutter speed Tv4 is set to $1/125$ seconds. When the object luminance information Be is not larger than 4, the shutter speed Tv4 is set to a value which decreases at such a rate that it becomes lower by one step as the object luminance information Be becomes smaller by two steps. When the object luminance information Be is larger than 8, the shutter speed Tv4 is set to a value which increases at such a rate that it becomes higher by one step as the object luminance information Be becomes larger by two steps.

As described above, the fourth program diagram is selected when the shooting magnification is larger than 0.5, and a camera shake or a motion of the object has occurred. In the fourth program diagram, when the object luminance information Be is larger than 4, the aperture value Av4 is set to 8.0. Therefore, it is possible to obtain a depth of field suitable for the close-up shooting at a shooting magnification of larger than 0.5. Further, in this case, although the shutter speed Tv4 is higher than $1/125$, it is possible to reduce a camera-shake blur and an object-motion blur, which makes it possible to prevent an image from being blurred.

Although in the present embodiment, when a camera shake or a motion of the object has occurred, the fourth program diagram is used, in the close-up shooting at a shooting magnification of larger than 0.5, by stopping down the aperture to thereby increase the depth of field, it is possible to perform shooting with a whole main object is in focus. Therefore, in the second embodiment, even when a camera shake or a motion of the object has occurred, the shooting operation is performed with priority given to the depth of field.

That is, in a situation where the luminance information based on the photometric result is the same, the aperture value is set to a larger value (i.e. the aperture is narrowed) when the shooting magnification is larger than the first value and a shake of the image pickup apparatus or a motion of the object within the imaging screen has occurred than when the shooting magnification is larger than the second value and smaller than the first value.

As described above, also in the second embodiment of the present invention, not only it is possible to obtain an excellent shooting result, but also it is possible to reduce a failure in shooting due to a camera-shake blur and an object-motion blur.

The program diagrams shown in the above description are given only by way of example, and the program diagrams are not limited to these. The program diagrams may be varied according to the specification of the interchangeable lens unit, such as a focal length and an F value.

Further, although in the above-described example, the focal length and the object distance information of the interchangeable lens unit are used in determining the shooting magnification, mounting of a lens or an accessory dedicated to the close-up shooting may be detected. Then, this detection may be used in place of the determination that the shooting magnification is larger (higher) than a predetermined value.

Further, by providing a close-up shooting-dedicated mode or a close-up shooting-dedicated position for the interchangeable lens unit, the controller 41 may determine that the shooting magnification is larger than a predetermined value when the interchangeable lens unit is set to the close-up shooting-dedicated mode or the close-up shooting-dedicated position. Further, whether or not a camera shake occurs may be detected by detecting that the camera is fixed on a fixing device, such as a tripod. Further, the camera shake information and the object motion information may be acquired according to detection by the focus detecting sensor 20.

Although in the above-described example, when acquiring the camera shake information and the object motion information, the object luminance information B(i) in the logarithmic compression system for each of the plurality of photometric areas is used, the camera shake information and the object motion information may be acquired using the object luminance information Br(i), and the object color information Cx(i) and Cy(i) in the linear system. Further, a camera shake and a motion of the object may be detected based on blocks different from the 256 divided blocks for the exposure calculation.

As is clear from the above description, in the example shown in FIG. 4, the controller 41, the focus detecting sensor 20, and the distance encoder 56 function as an acquisition unit, and the photometric sensor 26 and the controller 41 function as a photometric unit. The controller 41 further functions as an exposure calculation unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims the benefit of Japanese Patent Application No. 2012-030550, filed Feb. 15, 2012, which is hereby incorporated by reference herein in its entirety.

What is claimed is:

1. An image pickup apparatus comprising:
an acquisition unit configured to acquire information on a shooting magnification;
a photometric unit configured to perform photometry; and
an exposure calculation unit configured to determine an aperture value and a shutter speed, based on the information on the shooting magnification acquired by said acquisition unit and a result of photometry by said photometric unit,
wherein in a situation where luminance information based on the result of photometry is the same, said exposure calculation unit sets the aperture value to a larger value when the shooting magnification based on the information on the shooting magnification acquired by said acquisition unit is larger than a first value than when the shooting magnification is not larger than the first value, and in a situation where the shooting magnification is larger than the first value and the luminance information based on the result of photometry is the same, said exposure calculation unit sets the aperture value to a larger value and the shutter speed to a lower value when neither a shake of the image pickup apparatus nor a motion of an object within an imaging screen has occurred than when a shake of the image pickup apparatus or a motion of an object within the imaging screen has occurred.

2. The image pickup apparatus according to claim 1, wherein in the situation where the luminance information based on the result of photometry is the same, said exposure calculation unit sets the aperture value to a larger value when the shooting magnification is larger than the first value and a shake of the image pickup apparatus or a motion of an object within the imaging screen has occurred than when the shooting magnification is not larger than a second value which is smaller than the first value.

3. The image pickup apparatus according to claim 2, wherein in the situation where the luminance information based on the result of photometry is the same, said exposure calculation unit sets the aperture value to a larger value when the shooting magnification is larger than the first value and a shake of the image pickup apparatus or a motion of an object within the imaging screen has occurred than when the shooting magnification is larger than the second value and smaller than the first value.

4. The image pickup apparatus according to claim 1, wherein when the shooting magnification is larger than the first value and a shake of the image pickup apparatus or a motion of an object within the imaging screen has not occurred, said exposure calculation unit sets the aperture value to a fixed value irrespective of the luminance information based on the result of photometry.

5. The image pickup apparatus according to claim 1, wherein when the shooting magnification is within a predetermined range, in a situation where the luminance information based on the result of photometry is the same, said exposure calculation unit sets the aperture value to a larger value when the shooting magnification is larger than the first value than when the shooting magnification is not larger than the first value, whereas in a situation where the shooting magnification is larger than the first value and t the luminance information based on the result of photometry is the same, said exposure calculation unit sets the aperture value to a larger value and the shutter speed to a lower value when neither a shake of the image pickup apparatus nor a motion of an object within an imaging screen has occurred than when a shake of the image pickup apparatus or a motion of an object within the imaging screen has occurred.

6. A method of controlling an image pickup apparatus comprising:
acquiring information on a shooting magnification;
performing photometry; and
performing exposure calculation for determining an aperture value and a shutter speed based on the acquired information on the shooting magnification and a result of the photometry,
wherein said exposure calculation includes setting, in a situation where luminance information based on the result of photometry is the same, the aperture value to a larger value when the shooting magnification based on the acquired information on the shooting magnification is larger than a first value than when the shooting magnification is not larger than the first value, and setting, in a situation where the shooting magnification is larger than the first value and the luminance information based on the result of photometry is the same, the aperture value to a larger value and the shutter speed to a lower value when neither a shake of the image pickup apparatus nor a motion of an object within an imaging screen has occurred than when a shake of the image pickup apparatus or a motion of an object within the imaging screen has occurred.

7. The method according to claim 6, wherein in the situation where the luminance information based on the result of photometry is the same, said exposure calculation includes setting the aperture value to a larger value when the shooting magnification is larger than the first value and a shake of the image pickup apparatus or a motion of an object within the imaging screen has occurred than when the shooting magnification is not larger than a second value which is smaller than the first value.

8. The method according to claim 7, wherein in the situation where the luminance information based on the result of photometry is the same, said exposure calculation includes setting the aperture value to a larger value when the shooting magnification is larger than the first value and a shake of the image pickup apparatus or a motion of an object within the imaging screen has occurred than when the shooting magnification is larger than the second value and smaller than the first value.

9. The method according to claim 6, wherein when the shooting magnification is larger than the first value and a shake of the image pickup apparatus or a motion of an object within the imaging screen has not occurred, said exposure calculation includes setting the aperture value to a fixed value irrespective of the luminance information based on the result of photometry.

10. The method according to claim 6, wherein when the shooting magnification is within a predetermined range, in a situation where the luminance information based on the result of photometry is the same, said exposure calculation includes setting the aperture value to a larger value when the shooting magnification is larger than the first value than when the shooting magnification is not larger than the first value, whereas in a situation where the shooting magnification is larger than the first value and t the luminance information based on the result of photometry is the same, said exposure calculation includes setting the aperture value to a larger value and the shutter speed to a lower value when neither a shake of the image pickup apparatus nor a motion of an object within an imaging screen has occurred than when a shake of the image pickup apparatus or a motion of an object within the imaging screen has occurred.

11. A non-transitory computer-readable storage medium storing a computer-executable program for causing a computer included in an image pickup apparatus to execute a method of controlling the image pickup apparatus, wherein the method comprises:
acquiring information on a shooting magnification;
performing photometry; and
performing exposure calculation for determining an aperture value and a shutter speed based on the acquired information on the shooting magnification and a result of the photometry,
wherein said exposure calculation includes setting, in a situation where luminance information based on the result of photometry is the same, the aperture value to a larger value when the shooting magnification based on the acquired information on the shooting magnification is larger than a first value than when the shooting magnification is not larger than the first value, and setting, in a situation where the shooting magnification is larger than the first value and the luminance information based on the result of photometry is the same, the aperture value to a larger value and the shutter speed to a lower value when neither a shake of the image pickup apparatus nor a motion of an object within an imaging screen has occurred than when a shake of the image pickup apparatus or a motion of an object within the imaging screen has occurred.

12. The non-transitory computer-readable storage medium according to claim 11, wherein in the situation where the luminance information based on the result of photometry is the same, said exposure calculation includes setting the aperture value to a larger value when the shooting magnification is larger than the first value and a shake of the image pickup apparatus or a motion of an object within the imaging screen has occurred than when the shooting magnification is not larger than a second value which is smaller than the first value.

13. The non-transitory computer-readable storage medium according to claim 12, wherein in the situation where the luminance information based on the result of photometry is the same, said exposure calculation includes setting the aperture value to a larger value when the shooting magnification is larger than the first value and a shake of the image pickup apparatus or a motion of an object within the imaging screen has occurred than when the shooting magnification is larger than the second value and smaller than the first value.

14. The non-transitory computer-readable storage medium according to claim 11, wherein when the shooting magnification is larger than the first value and a shake of the image pickup apparatus or a motion of an object within the imaging screen has not occurred, said exposure calculation includes setting the aperture value to a fixed value irrespective of the luminance information based on the result of photometry.

15. The non-transitory computer-readable storage medium according to claim 11, when the shooting magnification is within a predetermined range, in a situation where the luminance information based on the result of photometry is the same, said exposure calculation includes setting the aperture value to a larger value when the shooting magnification is larger than the first value than when the shooting magnification is not larger than the first value, whereas in a situation where the shooting magnification is larger than the first value and t the luminance information based on the result of photometry is the same, said exposure calculation includes setting the aperture value to a larger value and the shutter speed to a lower value when neither a shake of the image pickup apparatus nor a motion of an object within an imaging screen has occurred than when a shake of the image pickup apparatus or a motion of an object within the imaging screen has occurred.

* * * * *